(12) United States Patent
Fosaaen et al.

(10) Patent No.: US 10,598,072 B2
(45) Date of Patent: Mar. 24, 2020

(54) RESISTIVE BASED COMBUSTION SENSING METHOD AND APPARATUS

(71) Applicant: Kerdea Technologies, Inc., Greenville, NC (US)

(72) Inventors: Ken Ervin Fosaaen, Winterville, NC (US); Horizon Walker Gitano-Briggs, Nibong Tebal (MY)

(73) Assignee: Kerdea Technologies, Inc., Greenville, NC (US)

(*) Notice: Subject to any disclaimer, the term of this patent is extended or adjusted under 35 U.S.C. 154(b) by 16 days.

(21) Appl. No.: 16/080,097

(22) PCT Filed: Mar. 6, 2017

(86) PCT No.: PCT/US2017/020910
§ 371 (c)(1),
(2) Date: Aug. 27, 2018

(87) PCT Pub. No.: WO2017/155873
PCT Pub. Date: Sep. 14, 2017

(65) Prior Publication Data
US 2019/0055874 A1 Feb. 21, 2019

Related U.S. Application Data

(60) Provisional application No. 62/305,214, filed on Mar. 8, 2016.

(51) Int. Cl.
*F01N 11/00* (2006.01)
*F02D 41/14* (2006.01)
(Continued)

(52) U.S. Cl.
CPC ........ *F01N 11/007* (2013.01); *F02D 41/1455* (2013.01); *F02D 41/1494* (2013.01);
(Continued)

(58) Field of Classification Search
CPC ............. F01N 11/007; F01N 2560/025; F01N 2560/20; F02D 2200/1015; F02D 35/028;
(Continued)

(56) References Cited

U.S. PATENT DOCUMENTS 4,491,921 A  1/1985 Sugiyama et al.
4,825,838 A  5/1989 Osuga et al.
(Continued)

FOREIGN PATENT DOCUMENTS

DE  4228052 A1  4/1993
DE  10230786 A1  1/2004
(Continued)

*Primary Examiner* — Audrey K Bradley
*Assistant Examiner* — Anthony Ayala Delgado
(74) *Attorney, Agent, or Firm* — Coats + Bennett, PLLC (57) ABSTRACT

Sensing combustion events using a resistive based oxygen sensor exposed to exhaust gases of a periodic combustion process in a combustion engine. The oxygen sensor is disposed in the exhaust plenum of the engine and includes a metal oxide semiconductor layer bridging a gap between first and second electrodes. Spikes in the resistance of the metal oxide semiconductor layer, caused by its reaction to transient changes in the oxygen level and exhaust temperature, are indicated in a combustion signal. The combustion signal may be used to monitor for combustion misfire event(s). Further, a combustion misfire event may be detected by comparing the detected spike timing with expected spike timing, with a spike not being present at a time when a spike is expected indicating a combustion misfire event. Related devices and systems are also disclosed.

18 Claims, 8 Drawing Sheets

(51) Int. Cl.
*G01M 15/10* (2006.01)
*F02D 41/22* (2006.01)
*F02D 35/02* (2006.01)

(52) U.S. Cl.
CPC ........... *F02D 41/22* (2013.01); *G01M 15/104* (2013.01); *F01N 2560/025* (2013.01); *F01N 2560/20* (2013.01); *F02D 35/028* (2013.01); *F02D 2200/1015* (2013.01)

(58) Field of Classification Search
CPC ............ F02D 41/1455; F02D 41/1494; G01M 15/104
See application file for complete search history.

(56) References Cited

U.S. PATENT DOCUMENTS

| | | |
|---|---|---|
| 5,983,866 A | 11/1999 | Ginzel et al. |
| 8,586,394 B2 | 11/2013 | Fosaaen |
| 8,959,987 B2 | 2/2015 | Fosaen |
| 9,219,152 B2 | 12/2015 | Wu et al. |
| 2014/0130779 A1 | 5/2014 | Fosaaen |
| 2015/0233289 A1 | 8/2015 | Younkins et al. |
| 2016/0040644 A1 | 2/2016 | Martin et al. |

FOREIGN PATENT DOCUMENTS

| | | |
|---|---|---|
| DE | 102006006114 A1 | 8/2007 |
| DE | 102006031081 B3 | 12/2007 |
| EP | 0282841 A2 | 9/1988 |
| WO | 9837322 A1 | 8/1998 |

RESISTIVE BASED COMBUSTION SENSING METHOD AND APPARATUS

RELATED APPLICATIONS

This application claims the benefit of U.S. Provisional Application No. 62/305,214, filed 8 Mar. 2016, the entire disclosure of which is incorporated herein by reference.

BACKGROUND

This application is related to combustion sensors, methods of using variable resistance oxygen sensors as combustion sensors, and related devices and systems for use with periodic combustion processes, such as in internal combustion engines.

In internal combustion engines under certain conditions, combustion may not take place properly. For example, a combustion misfire event occurs when the air and fuel mixture does not combust in a cylinder during a given cycle. Combustion misfire events result in loss of power, poor emissions, performance, and the potential for combustion to take place in the exhaust stream, resulting in damage to the exhaust management components. Often such phenomena take place intermittently, yet may still have a significant impact on the engine and/or emission system performance.

Accordingly, it is desirable to detect when combustion misfire events occur in order for corrective measures to be implemented. Currently, pressure sensors located in the compression chamber are used to detect misfire events. However, such pressure sensors are expensive due to the need to design them for the harsh environment of the combustion chambers. Combustion misfire events may also be detected by monitoring the angular velocity of the engine's crankshaft for minor variations in the expected rotation of the crankshaft as the result of misfiring; however, this approach requires complex algorithms to deal with the high signal to noise ratio inherent in this approach. Combustion misfire events may also be detected by monitoring analysis of the ionization current in the sparkplug circuit and/or optical measurement of the combustion process, both of which are better suited to basic research than commercial products.

As such, there remains a need for alternative combustion sensors for combustion engines, advantageously one that can be placed outside of the combustion chamber, such as in the exhaust plenum.

SUMMARY

The present application is related to sensing combustion events using a resistive based oxygen sensor exposed to exhaust gases of a periodic combustion process, for example in internal combustion engines, and related devices and systems.

In a first aspect, the present application is directed to a method of monitoring for a combustion misfire event in a combustion engine. The method comprises generating a combustion signal indicative of combustion timing of the engine based on a time varying resistance of an oxygen sensor disposed in an exhaust plenum of the engine, with the combustion signal indicating one or more spikes in the resistance that correspond to combustion events in the engine. The oxygen sensor comprises a metal oxide semiconductor layer bridging a gap between first and second electrodes. The resistance of the metal oxide semiconductor layer changes with temperature and oxygen content of exhaust gas passing by the oxygen sensor. The spikes are caused by an instantaneous change in the resistance of the metal oxide semiconductor layer caused by a combustion exhaust wavefront passing by the oxygen sensor. The method also comprises monitoring for a combustion misfire event based on the combustion signal, wherein a spike not being present at a time when a spike is expected indicates a combustion misfire event. The combustion signal may be an analog signal generated by the oxygen sensor, or otherwise as described herein. In some sub-aspects, the method may optionally include detecting the combustion misfire event by: a) comparing the combustion signal to a reference signal, the reference signal having a plurality of reference events that correspond to expected spike timing; and b) detecting the combustion misfire event based on the comparison. The comparing may utilize a pattern matching algorithm. The method may further comprise adjusting the reference signal based on engine speed and/or valve timing and/or spark timing of the engine. The reference signal may be retrieved from memory and/or may be generated based on the combustion signal itself. The method may further include notifying an engine management system associated with the engine of one or more detected combustion misfire events. In some sub-aspects, the method may optionally include detecting the combustion misfire event by: a) running a spike timer; and b) in response to detecting a spike in the combustion signal, resetting the spike timer; wherein expiration of the spike timer without a spike being detected indicates that a spike is not present at a time when a spike is expected, thereby indicating a combustion misfire event. The duration of the spike timer may be adjusted based on engine speed and/or valve timing and/or spark timing of the engine.

In a second aspect, the present application is directed to a combustion sensor system for monitoring combustion misfire events in a combustion engine. The combustion sensor system comprises an oxygen sensor and processing circuitry. The oxygen sensor comprises a metal oxide semiconductor layer bridging a gap between first and second electrodes. The resistance of the metal oxide semiconductor layer changes with temperature and oxygen content of exhaust gas passing by the oxygen sensor. The processing circuitry is connectable to the oxygen sensor and configured to, when operatively connected to the oxygen sensor, be operative to: a) receive a combustion signal indicative of combustion timing of the engine based on a time varying resistance of the oxygen sensor when the oxygen sensor is disposed in an exhaust plenum of the engine, with the combustion signal indicating one or more spikes in the resistance that correspond to combustion events in the engine; and b) monitor for a combustion misfire event based on the combustion signal, wherein a spike not being present at a time when a spike is expected indicates a combustion misfire event. The processing circuitry may be further configured to, when operatively connected to the oxygen sensor, detect a combustion misfire event by: a) comparing the combustion signal to a reference signal, the reference signal having a plurality of reference events that correspond to expected spike timing; and b) detecting the combustion misfire event based on the comparison. The combustion sensor system may further comprise a voltage divider network disposed in series with the oxygen sensor, with the voltage divider network comprising first and second resistors, and the processing circuitry may be configured to connect to the oxygen sensor via a node between the first and second resistors. The semiconductor layer may be a p-type semiconductor layer or an n-type semiconductor layer. The combustion sensor system may further comprise a heater element, and the processing circuitry may be configured to, when operatively connected to the oxygen sensor, determine a temperature of the oxygen sensor based on a resistance of the heater element. The combustion sensor system may be such that the processing circuitry is configured to, when operatively connected to the oxygen sensor, control a nominal temperature of the oxygen sensor by adjusting a voltage applied to the heater element. The combustion sensor system may be such that the processing circuitry is configured to, when operatively connected to the oxygen sensor, determine an oxygen level based on a resistance of the oxygen sensor on a time scale that is at least 10 times longer than a duration of a spike.

The various aspects discussed above may be used alone or in any combination. The various apparatus disclosed herein may operate according to any combination of various methods disclosed herein, and vice versa. Further, the present invention is not limited to the above features and advantages. Indeed, those skilled in the art will recognize additional features and advantages upon reading the following detailed description, and upon viewing the accompanying drawings.

DETAILED DESCRIPTION

The present application is related to sensing combustion events using a resistive based oxygen sensor 40 exposed to exhaust gases of a periodic combustion process, and related devices and systems. Thus, the resistive based oxygen sensor 40 may be used as a combustion sensor, optionally in addition to functioning in its normal role as an oxygen sensor. In one or more aspects, combustion misfire events in a combustion engine are monitored for by monitoring for spikes in the resistance of an oxygen sensor 40. The oxygen sensor 40 is disposed in the exhaust plenum 19 of an engine 10 and comprises a metal oxide semiconductor layer 50 bridging a gap 48 between first and second electrodes 44,46. Very quick transient variations (typically referred to herein as "spikes," but alternatively referred to as "pulses") in the resistance of the metal oxide semiconductor layer 50, caused by its reaction to transient changes in the oxygen level and exhaust temperature, are indicated in a combustion signal. The combustion signal may be used to monitor for combustion misfire event(s). A combustion misfire event may be detected by comparing the detected spike timing with expected spike timing, wherein a spike not being present at a time when a spike is expected indicates a combustion misfire event.

For simplicity, the discussion herein may generally be in the context of a small displacement gasoline powered spark ignition internal combustion engine, but it should be understood that the methods and devices disclosed herein may be used in other periodic internal combustion engine applications, such as compression ignition engines, hydrogen powered engines, other hydrocarbon powered engines, diesel engines, Homogeneous Charge Compression Ignition (HCCI) engines, and Reactivity Controlled Compression Ignition (RCCI) engines. These engines may be used for any suitable purpose, such as automobiles, motorcycles, boats, generators, trains, ships, etc.

Figure 1:
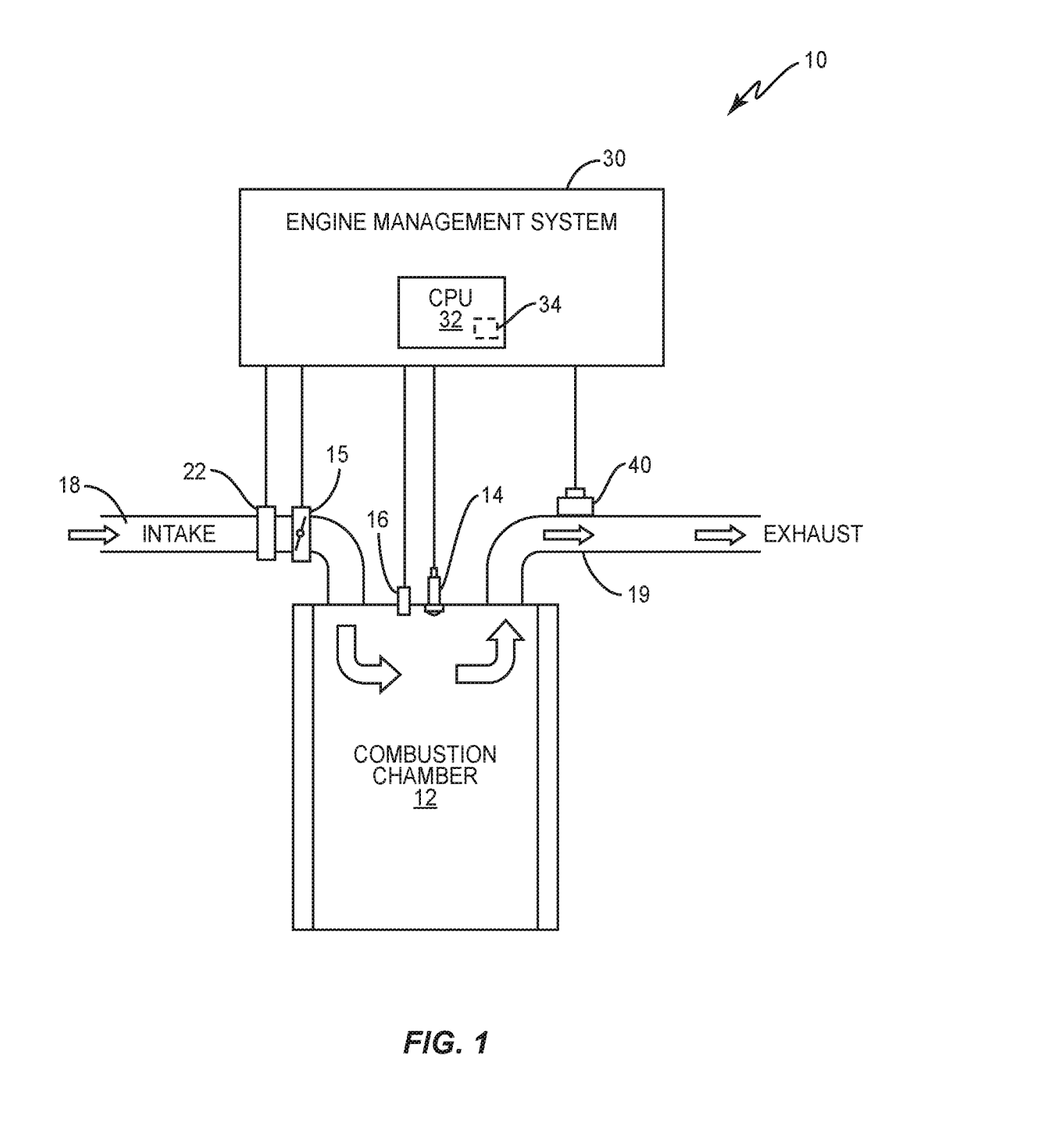
FIG. 1 shows schematic representation of an engine, having an oxygen sensor based combustion sensor assembly of one or more embodiments of the present invention and/or where the method of the one or more embodiments of the present invention may be implemented.

FIG. 1 shows a schematic of an exemplary internal combustion engine 10, which may be of any type (e.g., piston, rotary, nutating disk, etc.). The engine 10 includes at least one combustion chamber 12 with associated piston, valves, etc. (not shown), an intake manifold 18, an exhaust plenum 19, and an engine management system 30. The intake manifold 18 supplies air to the combustion chamber 12. A mass airflow (MAF) sensor or manifold air pressure (MAP) sensor 22, advantageously with associated air intake temperature sensor, is disposed in the intake manifold 18 so that the incoming air conditions may be monitored as the airflow changes due to the opening or closing of the throttle body 15 which is used to control the load/speed of the engine, typically based on operator demand. A controllable fuel metering system, such as a fuel injector 16, supplies fuel to the combustion chamber under control of the engine management system 30. For diesel engines, the fuel injector 16 typically sprays fuel directly into the combustion chamber 12, and ignition takes place as a result of reaching a particular compression level. For spark ignition engines, the fuel injector 16 may spray fuel into the intake manifold or directly into the combustion chamber 12, and a spark ignition device 14 (e.g., spark plug) operates under the control of the engine management system 30 to ignite the air and fuel mixture in the combustion chamber 12 at the desired time in the cycle for proper combustion. The oxygen/combustion sensor 40 is disposed in the exhaust plenum 19. The engine management system 30 includes one or more processing circuits 32 (collectively "controller") that control the fuel supply amount and timing, ignition timing, and other engine parameters based on the input from the various sensors and the programming of the processing circuits 32. For example, the engine management system 30 uses the oxygen sensor 40, as described below, to help monitor for engine misfire events. Other than the particulars of the oxygen sensor 40 and the operation of the processing circuit(s) 32 described in greater detail below, the configuration and operations of the engine 10 are well known to those of skill in the art, and are not discussed further herein in the interests of clarity.

Figure 4:
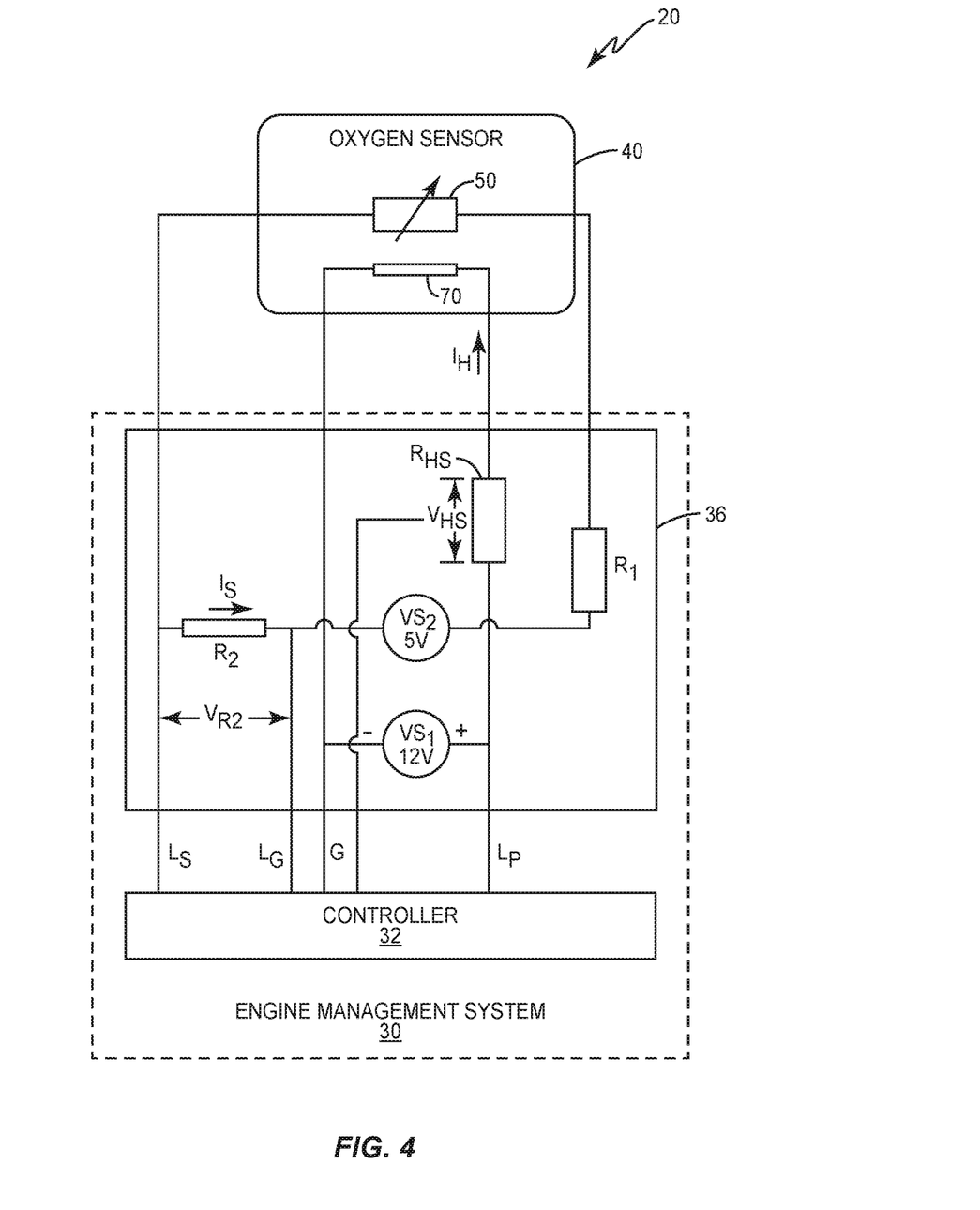
FIG. 4 shows a simplified schematic of the oxygen sensor of FIG. 2 connected to a controller via a connecting circuit, forming a combustion sensor assembly.

Referring to FIGS. 1 and 4, a combustion sensor assembly 20 includes an oxygen sensor 40, and associated processing circuitry 32. The oxygen sensor 40 has a small thermal mass such that the oxygen sensor responds quickly to changes in temperature and exhaust conditions. Advantageously, the oxygen sensor 40 is a semiconductor based oxygen sensor, such as the type described in U.S. Pat. Nos. 8,586,394 and 9,219,152 and/or U.S. Patent Application Publication No. 20140130779.

Figure 2:
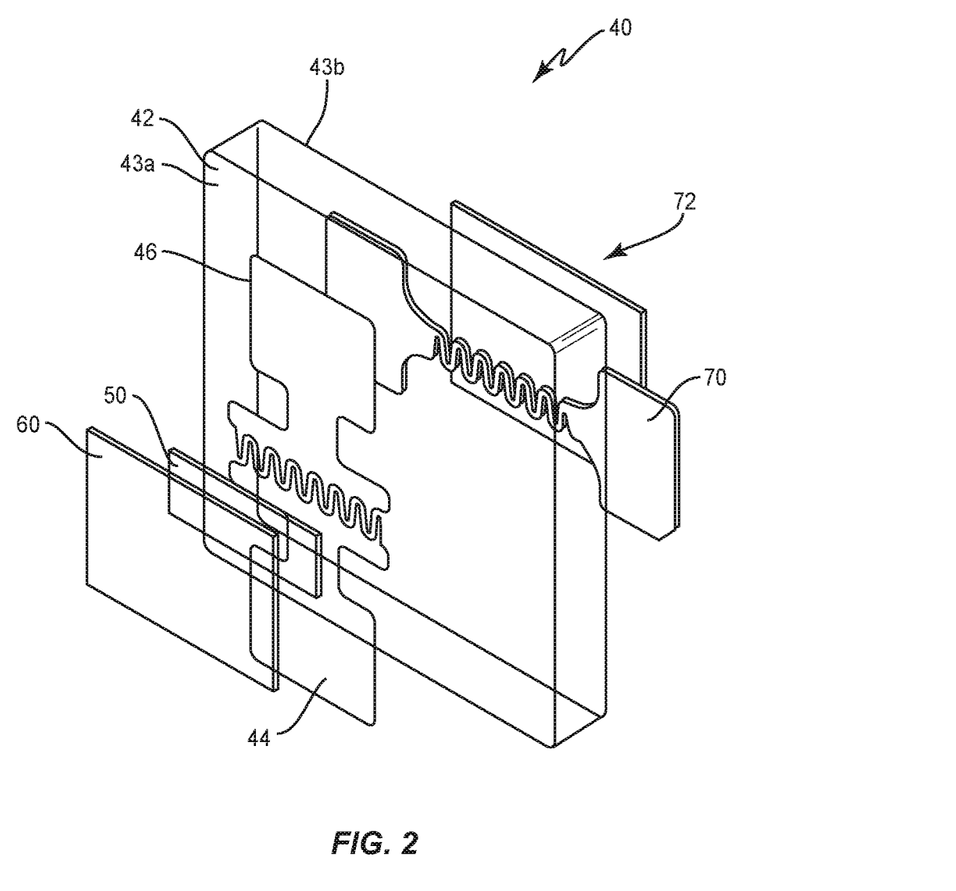
FIG. 2 shows a partially exploded view of an exemplary oxygen sensor.
Figure 3:
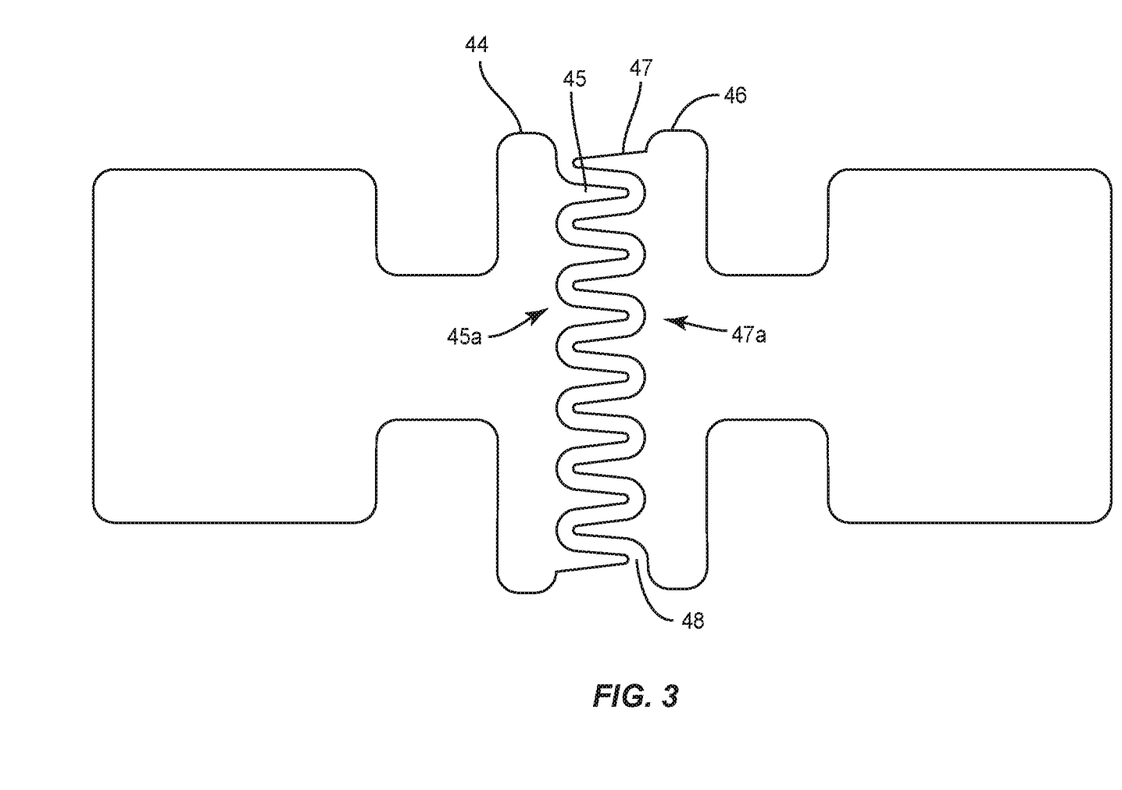
FIG. 3 shows the electrodes of FIG. 2.

Referring to FIGS. 2-3, the oxygen sensor 40 generally includes a first electrode 44 and a second electrode 46 affixed to one side 43a of a dielectric substrate 42 and disposed in spaced relation to each other so that there is a lateral gap 48 between the electrodes 44,46. The first electrode 44 has a series of fingers 45 that form a comb structure 45a, and the second electrode 46 has a series of fingers 47 that form a comb structure 47a. While the comb structures 45a,47a are shown as linear, any suitable shape may alternatively be used. The two comb structures 45a,47a are interleaved, but remain spaced from each other. A semiconductor bridge 50 connects the first electrode 44 and the second electrode 46. The semiconductor bridge 50 is formed by a semiconductor layer that bridges the gap 48 between the two electrodes 44,46, covering the comb structures 45a,47a. The semiconductor bridge 50 may comprise an n-type metal oxide semiconductor material (e.g., $TiO_2$) or may comprise a p-type metal oxide semiconductor material (e.g., $Cr_2O_3$). A porous dielectric material layer 60, optionally with catalytic materials (e.g., platinum, palladium, and or rhodium) may be disposed over the semiconductor bridge 50 so as to mechanically protect the semiconductor bridge 50 and/or catalyze exhaust gasses to bring them to equilibrium.

In some embodiments, a resistor 70 may be mounted to the opposing side 43b of the dielectric substrate 42, generally opposite the semiconductor bridge 50 and the electrodes 44,46. The resistor 70 may take a suitable form, such as a layer of platinum (or other suitable material having a resistance that varies predictably with temperature in the temperature range typically encountered in the exhaust plenum 19) arranged in a resistor pattern and affixed to the substrate 42. In other embodiments (not shown), the resistor 70 may be disposed under the semiconductor bridge 50 and the electrodes 44,46, on the same side 43a of the substrate 42, but electrically isolated from the electrodes 44,46 and the semiconductor bridge 70. The resistor 70 can either be used to measure the temperature of the oxygen sensor 40 in a passive state due to the strong linear relationship between its resistance and the temperature, and/or the resistor 70 can be used to control the temperature of the oxygen sensor 40 to a narrow value by adjusting the applied voltage, thereby acting as a heater. For ease of clarity, this resistor 70 may be referred to herein as the heater resistor 70.

Referring to FIG. 4, the oxygen sensor 40 is connected to the controller 32 via suitable circuitry 36. In one or more illustrative embodiments, changes in the resistance of the oxygen sensor 40 are converted into a voltage signal, such as by being routed through a resistance network, so that the controller 32 receives different voltage inputs for different sensed oxygen and temperature levels. The resistive network may be as shown in FIG. 4, although such is not required in all embodiments. The resistor network of FIG. 4 includes a shunt resistor $R_{HS}$, resistors $R_1$ and $R_2$, a twelve volt voltage source $VS_1$, a five volt voltage source $VS_2$, a power line $L_P$, a ground line G, an oxygen sense line $L_S$, and a reference line $L_G$. The heater resistor 70 is disposed between $L_P$ and G, and is supplied with power from twelve volt power source $VS_1$, via shunt resistor $R_{HS}$. A voltage drop $V_{HS}$ is measured across shunt resistor $R_{HS}$. A voltage drop $VR_2$ is measured across resistor $R_2$, between line $L_S$ and line $L_G$. The controller 32 advantageously receives $L_G$, $L_S$, and $V_{HS}$, used to calculate the relevant values as discussed further below. Note that the resistance network may be integrated into an oxygen sensor housing, integrated into the controller 32 and/or engine management system 30, be a separate component or components between the oxygen sensor 40 and the controller 32, or dispersed in any suitable manner. Note further that voltage drop $V_{HS}$ may be sensed via two leads, one on each side of shunt resistor $R_{HS}$, with each lead feeding a line to controller 32; this arrangement and similar two-lead sensing lines are shown in simplified fashion in FIG. 4 for clarity.

The resistance $R_S$ of the oxygen sensor 40 may be determined by any suitable way. For example, the current $I_S$ through the oxygen sensing portion (44,50,46) of the oxygen sensor 40 may be calculated as the voltage drop $VR_2$ across resistor $R_2$. Further, the overall resistance $R_{SC}$ along the five volt circuit through resistor $R_1$, oxygen sensing portion, and resistor $R_2$ may be calculated as $R_{SC}$=voltage of the circuit divided by current of the circuit, or five (volts) divided by $I_S$. Then, the resistance $R_S$ of the oxygen sensing portion may be calculated as $R_S=R_{SC}-R_1-R_2$. Thus, the resistance $R_S$ of the oxygen sensing portion may be determined based on knowledge of the voltage of voltage source $VS_2$, the resistance of resistors $R_1$ and $R_2$, the voltage drop $VR_2$ across resistor $R_2$ (voltage difference between line $L_S$ and $L_G$). In alternate embodiments, resistor $R_1$ may be omitted from the circuit, or additional resistors may be added. If resistor $R_1$ is omitted, then the resistance $R_S$ of the oxygen sensing portion may be calculated as $R_S=R_{SC}-R_2$; or, if additional resistors are added, the calculation of $R_S$ advantageously takes their presence into account. The oxygen level in the exhaust gases may then be determined based on the resistance of the oxygen sensing portion, with the sensed oxygen level advantageously temperature compensated, as appropriate.

It should be noted that the temperature of the oxygen sensor 40 may be determined based on the resistance of the heater resistor 70. For example, the current $I_H$ in the heater resistor 70 may be calculated as the voltage drop $V_{HS}$ across the shunt resistor $R_{HS}$, divided by the resistance of the shunt resistor $R_{HS}$, or $I_H=V_{HS}/R_{HS}$. Then, the resistance $R_H$ of the heater resistor 70 may be calculated based on the voltage drop across the heater resistor 70 divided by the current $I_H$ through the heater resistor. Thus, $R_H$ may be calculated as $R_H=(12-V_{HS})/I_H$. Then, using $R_H$, temperature T may be calculated using a suitable formula, for example T=(M× $R_H$)+B, where the slope M and the constant B are dependent on the heater resistor design. As can be appreciated, M and B can be determined in a calibration process, and the relevant values stored in memory for use by the controller 32.

Assuming a constant voltage is supplied to the oxygen sensor 40, then the resistance of the semiconductor bridge 50 between the electrodes 44,46 (and hence the voltage drop across the oxygen sensor 40) should vary with the temperature of the exhaust in the exhaust plenum 19, and with the oxygen content of the exhaust. As discussed below, the time-varying resistance of the oxygen sensor 40 while the engine 10 is running may be used to monitor for combustion misfire events.

Figure 8:
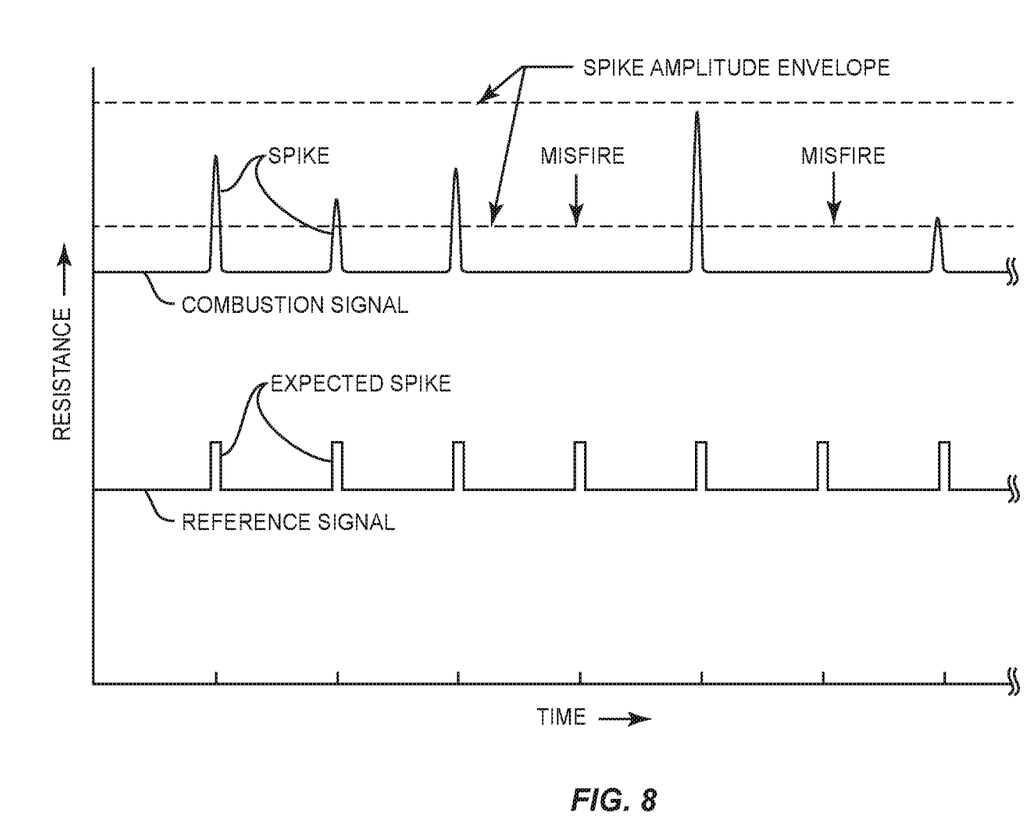
FIG. 8 shows an exemplary combustion signal and a reference signal, with two missing spikes shown.

If the thermal mass of the oxygen sensor 40 is small, and the response time of the semiconductor bridge 50 is fast, and the oxygen sensor 40 is located relatively close to the exhaust port of the combustion chamber 12, then the measured resistance over time should show a series of spikes (alternatively referred to as "pulses") corresponding to combustion events of the combustion engine 10. In particular, as a combustion wavefront from a combustion event passes through the exhaust plenum 19, the combustion wavefront will come in contact with the oxygen sensor 40. Because the oxygen sensor 40 has very little thermal mass, the instantaneous increase in temperature associated with the wavefront will result in a very brief transient increase in the temperature of the oxygen sensor 40, with a corresponding change (typically reduction) in resistance. In addition, the presence of free oxygen in the exhaust affects the resistance of the semiconductor bridge 50, which therefore changes the resistance of the oxygen sensor 40. Thus, each wavefront will cause a spike (either up or down, depending on the material of the semiconductor bridge 50) in the measured resistance, which will be in a very repeatable pattern with timing corresponding to the speed (rotations per minute (rpm)) at which the engine 10 is operating, and associated valve and spark timing. Thus, a combustion signal is generated that is indicative of combustion timing of the engine 10, with the combustion signal based on a time-varying resistance of an oxygen sensor 40 disposed in an exhaust plenum 19 of the engine 10. The combustion signal indicates one or more spikes in the signal/resistance that correspond to combustion events in the engine 10. The size and shape of the spikes will depend on the operating conditions of the engine (e.g., exhaust temperature, engine speed, etc.), but will be very short in duration compared with the time interval between spikes (corresponding to the cycle time between the normal periodic combustion events (e.g., spark events)), such as being about one to about ten percent of the duration between spikes. Indeed, the duration of the spikes or pulses may be relatively constant, despite changes in the duration between spikes (i.e., period or cycle time) caused by changes in the engine rpm, etc. In addition, as shown in FIG. 8, the spikes in the combustion signal may not be uniform in amplitude, but will have amplitudes that fall within a amplitude envelope range that allows for easy detection of the spikes. The combustion signal may be generated directly by the oxygen sensor 40. Thus, the output of the oxygen sensor 40 may be an analog signal $V_{R2}$ that is the voltage difference between line $L_S$ and line $L_G$. Alternatively, an analog to digital converter (not shown), internal to the controller 32 or disposed operatively between the oxygen sensor 40 and the controller 32, may generate a digital signal based on $V_{R2}$ (either as a separate signal or derived from line $L_S$ and line $L_G$). In another alternative, a sub-processing circuit (not shown) may be supplied $V_{R2}$ (either as a separate signal or derived from line $L_S$ and line $L_G$), and generate the combustion signal as a digital output that provides the timing of spikes in the resistance, either in absolute or relative terms. Regardless, the combustion signal is indicative of combustion timing of the engine, with the combustion signal indicating one or more spikes in resistance of the oxygen sensor 40 that correspond to combustion events in the engine 10.

This combustion signal is provided to the controller 32 for the controller 32 to process as appropriate. The controller 32 may monitor for a combustion misfire event based on the combustion signal in a variety of ways. For example, the controller 32 may monitor the time-varying resistance of the oxygen sensor 40, as indicated by the combustion signal over time, and note the timing of spikes in the resistance. Thus, the controller 32 may monitor for spikes in the resistance of the oxygen sensor 40 and the associated spike timing. The monitored spikes may then be compared to a reference signal that indicates a plurality of reference events that correspond to expected spike timing. Referring to FIG. 8, if the spikes of the combustion signal and the reference events of the reference signal match up, then no combustion misfire events are indicated. If a reference event in the reference signal indicates that a spike is expected, but the corresponding spike is missing in the combustion signal, then a combustion misfire event is indicated, corresponding in time to the missing spike. Thus, combustion misfire events may be monitored for by comparing the combustion signal to a reference signal, with a spike not being present (as indicated by the combustion signal) at a time when a spike is expected indicating a combustion misfire event.

The reference signal may be a reference signal recalled from memory based on the engine speed and/or valve timing and/or spark timing, or may be self-generated based on the combustion signal itself (e.g., detect a timing pattern of spikes, and repeat that pattern as the reference signal). Note that either or both of the combustion signal and the reference signal may be analog signals, or may be digital signals, or may be a signal that is simply a list of absolute or relative timing of spikes. All of these should be considered as "signals." And, any suitable pattern matching algorithm known in the art may be used to compare the spikes indicated by the combustion signal to the expected spikes indicated by the reference signal. Such pattern matching algorithms are known to those of skill in the art, for use with the pressure sensor-based combustion sensors, and are not explained in detail here in the interests of clarity.

The reference signal indicates when spikes are expected to occur in the combustion signal. Note that the timing of the spikes in the reference signal is delayed slightly relative to when spark occurs, in order to compensate for the time delay associated with opening the exhaust valves of the combustion chamber 12 and having the exhaust travel down the exhaust plenum 19 to the location of the oxygen sensor 40. Thus, for spark ignition engines, the spike timing reflected in the reference signal, and the spikes in the resistance of the oxygen sensor 40 reflected in the combustion signal, are shifted slightly in time as compared to the timing of the spark itself. As can be appreciated, the farther upstream the oxygen sensor 40 is located in the exhaust plenum (thereby getting closer to the combustion chamber 12), the smaller this time shift will be.

The reference signal for the comparison should correspond to the speed of the engine 10 and/or valve timing and/or spark timing, and should change as the speed of the engine 10 and/or valve timing changes. Thus, the controller 32 may compare the combustion signal to a first reference signal when the engine is running at a first rpm, and thereafter, when the engine rpm changes, adjust the reference signal accordingly. This adjustment may be accomplished by scaling (in time) the reference signal according to the speed of the engine 10. Alternatively, the controller 32 may adjust the reference signal by selecting a second reference signal from memory to use, based on the new rpm, thereby adjusting the expected spike timing reflected by the reference signal to the then-current engine rpm. The controller 32 may then compare the combustion signal at the new rpm to the second/adjusted reference signal to monitor for misfire events, in a similar fashion as indicated above.

Alternatively or additionally, a timer-based approach may be used. A timer 34, called a spike timer 34 herein, may be present in hardware and/or software. The duration of the spike timer 34 is set based on the speed and/or valve timing and/or spark timing of the engine, so that that the duration of the spike timer 34 is the interval between expected spikes (and therefore, combustion events). The spike timer 34 may be reset each time a spike is detected based on the combustion signal. If the spike timer 34 expires, indicating that an expected spike is missing, this indicates a combustion misfire event. As can be appreciated, it may be advantageous to add a small amount of extra time to the timer 34 duration, if desired, to help prevent false positive results.

In response to the detection of a combustion misfire event, the controller 32 may take appropriate action. For example, the controller 32 may notify other portions of the engine management system 30, so as to allow for corrective and/or diagnostic action, dynamic valve timing adjustment, etc. Alternatively or additionally, the controller 32 may make appropriate notifications of the misfire event, such as by causing a "check engine" light to be turned on and/or storing the time and other conditions related to the misfire event for future reference (e.g., later engine diagnostics). As can be appreciated, the controller 32 may take such action for each detected combustion misfire event, or may wait for a suitable number of detected combustion misfire events to occur, such as a threshold amount within a given time period.

Figure 5:
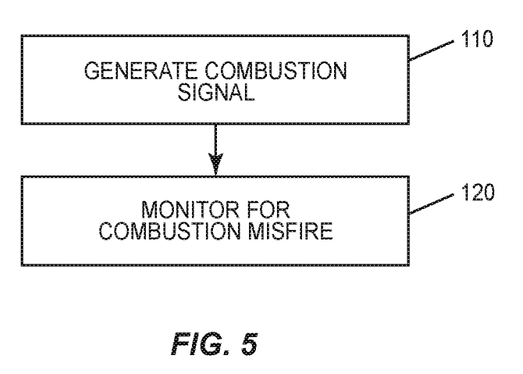
FIG. 5 shows a flowchart of one exemplary method.

Referring to FIG. 5, one method of monitoring for combustion misfire events includes generating the combustion signal (step 110) based on a time-varying resistance of an oxygen sensor 40 disposed in an exhaust plenum 19 of the engine 10; the combustion signal indicating one or more spikes in the resistance that correspond to combustion events in the engine 10. The method also includes monitoring for a combustion misfire event based on the combustion signal (step 120), wherein a spike not being present at a time when a spike is expected indicates a combustion misfire event.

Figure 6:
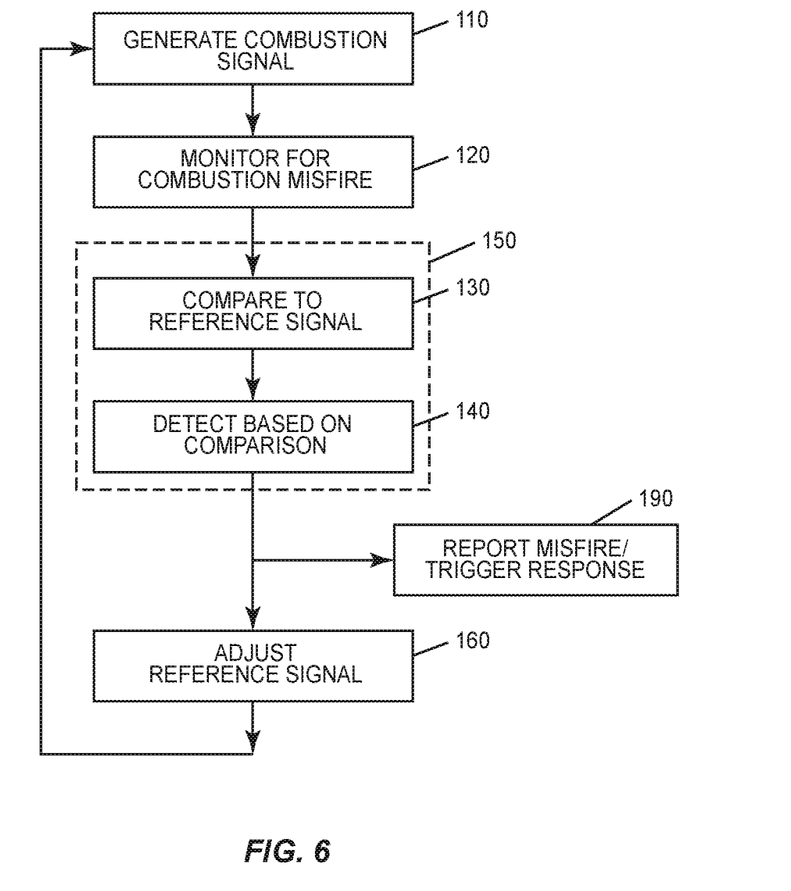
FIG. 6 shows a flowchart of another exemplary method.

Referring to FIG. 6, another method of monitoring for combustion misfire events includes generating the combustion signal (step 110) based on a time-varying resistance of an oxygen sensor 40 as described above, and monitoring for a combustion misfire event based on the combustion signal (step 120). The method also includes detecting the combustion misfire event (step 150) by comparing the combustion signal to a reference signal (step 130), the reference signal having a plurality of reference events that correspond to expected spike timing, and detecting the combustion misfire event based on the comparison (step 140). The method may optionally include adjusting the reference signal based on engine 10 speed and/or valve timing and/or spark timing of the engine 10 (step 160) and/or notifying an engine management system 30 associated with the engine 10 of one or more detected combustion misfire events (step 190).

Figure 7:
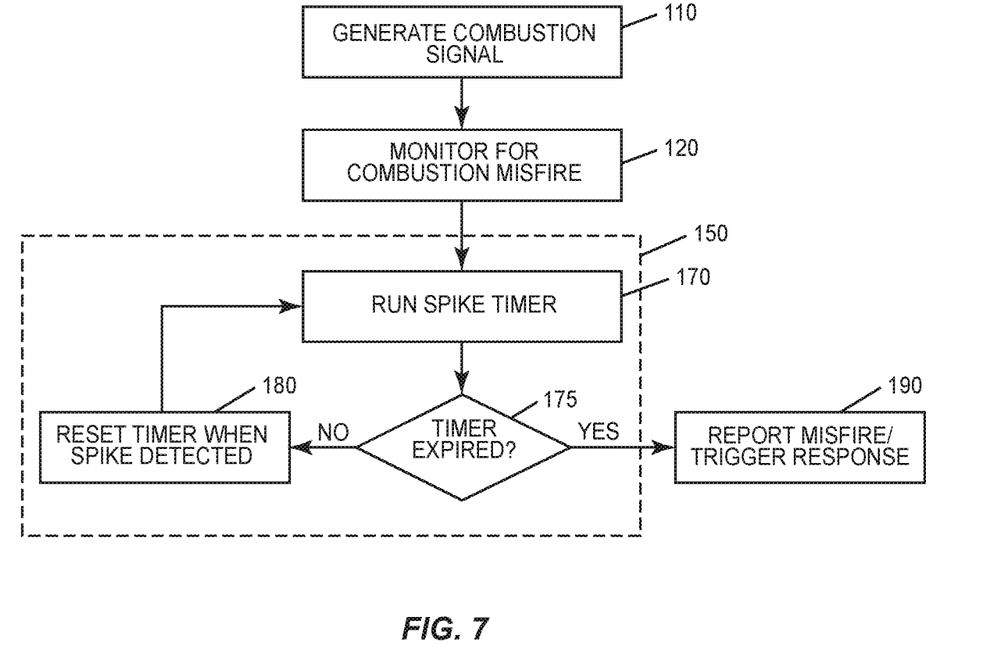
FIG. 7 shows a flowchart of still another exemplary method.

Referring to FIG. 7, yet another method of monitoring for combustion misfire events includes generating the combustion signal (step 110) based on a time-varying resistance of an oxygen sensor 40 as described above, and monitoring for a combustion misfire event based on the combustion signal (step 120). The method also includes detecting the combustion misfire event (step 150) by running a spike timer 34 (step 170), and if the spike timer 34 is not expired (step 175), resetting the spike timer 34 in response to detecting a spike in the combustion signal (step 180). If the timer 34 expires before a new spike is detected, then an engine misfire event is detected and appropriate steps are taken, such as notifying an engine management system 30 associated with the engine 10 of one or more detected combustion misfire events (step 190).

In addition to monitoring for combustion misfire events, the controller 32 may use data from the oxygen sensor 40 in a conventional fashion, such as to control the air:fuel mixture. In addition, or alternatively, there may be another oxygen sensor of any suitable type (not shown) associated with the engine 10 which is used for air:fuel mixture control.

The discussion above has been generally in the context of an engine 10 having a single combustion chamber 12, for better clarity. However, the present invention is not limited to single combustion chamber engines, and may be used with multiple combustion chamber (multiple cylinder) engines as well. And, a single combustion sensor 40 or combustion sensor system 20 may cover multiple combustion chambers 12, or there may be a dedicated combustion sensor 40 and/or combustion sensor system 20 for each combustion chamber 12 of the engine 10. In some versions, a single controller 32 may take and process data from several oxygen sensors 40 acting as combustion sensors. Further, it should be noted that placement of the oxygen sensor 40 further upstream in the exhaust plenum 19 is believed to improve performance. Thus, it may be advantageous to "close couple" the oxygen sensor(s) to the combustion chamber(s). Also, it should be noted that the time-varying resistance of the oxygen sensor 40 may be determined by observing changes in voltage or current through the oxygen sensor 40, and be represented by a varying voltage, or a varying current, or digital values, or any other known approach to representing time-varying values.

For more information about forming the electrodes 62,70, 80 and the MOS layers 56,58, and temperature and oxygen level sensing, see U.S. Patent Application Publication 20140130779 and/or U.S. Pat. Nos. 8,586,394 and 9,291, 526, the disclosures of which are incorporated herein by reference in their entirety.

The methods and engine control apparatuses discussed above provide the opportunity for enhanced combustion and/or engine control so that greater fuel economy and/or reduced emissions may be achieved.

The present invention may, of course, be carried out in other specific ways than those herein set forth without departing from the scope of the invention. The present embodiments are, therefore, to be considered as illustrative and not restrictive.

What is claimed is:

1. A method of monitoring for a combustion misfire event in a combustion engine, comprising:
    generating a combustion signal indicative of combustion timing of the engine based on a time-varying resistance of an oxygen sensor disposed in an exhaust plenum of the engine; the combustion signal indicating one or more spikes in the resistance that correspond to combustion events in the engine;
    monitoring for the combustion misfire event based on the combustion signal; wherein the oxygen sensor comprises a metal oxide semiconductor layer bridging a gap between first and second electrodes, wherein the resistance of the metal oxide semiconductor layer changes with temperature and oxygen content of exhaust gas passing by the oxygen sensor;
    wherein the spikes are caused by an instantaneous change the resistance of the metal oxide semiconductor layer caused by a combustion exhaust wavefront passing by the oxygen sensor;
    wherein the combustion misfire event is indicated by the resistance not spiking at an expected time.

2. The method of claim 1, further comprising detecting the combustion misfire event by:
    comparing the combustion signal to a reference signal, the reference signal having a plurality of reference events that correspond to expected spike timing;
    detecting the combustion misfire event based on the comparison.

3. The method of claim 2, wherein the comparing utilizes a pattern matching algorithm.

4. The method of claim 2, further comprising adjusting the reference signal based on engine speed and/or valve timing and/or spark timing of the engine.

5. The method of claim 2, further comprising retrieving the reference signal from memory.

6. The method of claim 2, further comprising generating the reference signal based on the combustion signal.

7. The method of claim 2, further comprising notifying an engine management system associated with the engine of one or more detected combustion misfire events.

8. The method of claim 1, further comprising detecting the combustion misfire event by:
running a spike timer;
in response to detecting spiking in the resistance indicated by the combustion signal, resetting the spike timer;
wherein expiration of the spike timer without spiking in the resistance being detected indicates the resistance did not spike at the expected time, thereby indicating the combustion misfire event.

9. The method of claim 8, further comprising adjusting a duration of the spike timer based on engine speed and/or valve timing and/or spark timing of the engine.

10. The method of claim 1, wherein the combustion signal is an analog signal generated by the oxygen sensor.

11. A combustion sensor system for monitoring for a combustion misfire event in a combustion engine, the combustion sensor system comprising:
an oxygen sensor comprising a metal oxide semiconductor layer bridging a gap between first and second electrodes;
wherein a resistance of the metal oxide semiconductor layer changes with temperature and oxygen content of exhaust gas passing by the oxygen sensor; processing circuitry connectable to the oxygen sensor and configured to, when operatively connected to the oxygen sensor, be operative to:
receive a combustion signal indicative of combustion timing of the engine based on a time-varying resistance of the oxygen sensor when the oxygen sensor is disposed in an exhaust plenum of the engine;
the combustion signal indicating one or more spikes in the resistance that correspond to combustion events in the engine;
monitor for the combustion misfire event based on the combustion signal;
wherein the combustion misfire event is indicated by the resistance not spiking at an expected time.

12. The combustion sensor system of claim 11, wherein the processing circuitry is configured to, when operatively connected to the oxygen sensor, detect the combustion misfire event by:
comparing the combustion signal to a reference signal, the reference signal having a plurality of reference events that correspond to expected spike timing;
detecting the combustion misfire event based on the comparison.

13. The combustion sensor system of claim 11:
further comprising a voltage divider network disposed in series with the oxygen sensor;
wherein the voltage divider network comprises first and second resistors;
wherein the processing circuitry is configured to connect to the oxygen sensor via a node between the first and second resistors.

14. The combustion sensor system of claim 11, wherein the semiconductor layer is a p-type semiconductor layer.

15. The combustion sensor system of claim 11, wherein the metal oxide semiconductor layer is an n-type semiconductor layer.

16. The combustion sensor system of claim 11:
wherein the oxygen sensor comprises a heater element;
wherein the processing circuitry is configured to, when operatively connected to the oxygen sensor, determine a temperature of the oxygen sensor based on a resistance of the heater element.

17. The combustion sensor system of claim 16, wherein the processing circuitry is configured to, when operatively connected to the oxygen sensor, control a nominal temperature of the oxygen sensor by adjusting a voltage applied to the heater element.

18. The combustion sensor system of claim 11, wherein the processing circuitry is configured to, when operatively connected to the oxygen sensor, determine an oxygen level based on a resistance of the oxygen sensor on a time scale that is at least 10 times longer than a duration of a spike in the resistance.

\* \* \* \* \*